Figure 1:
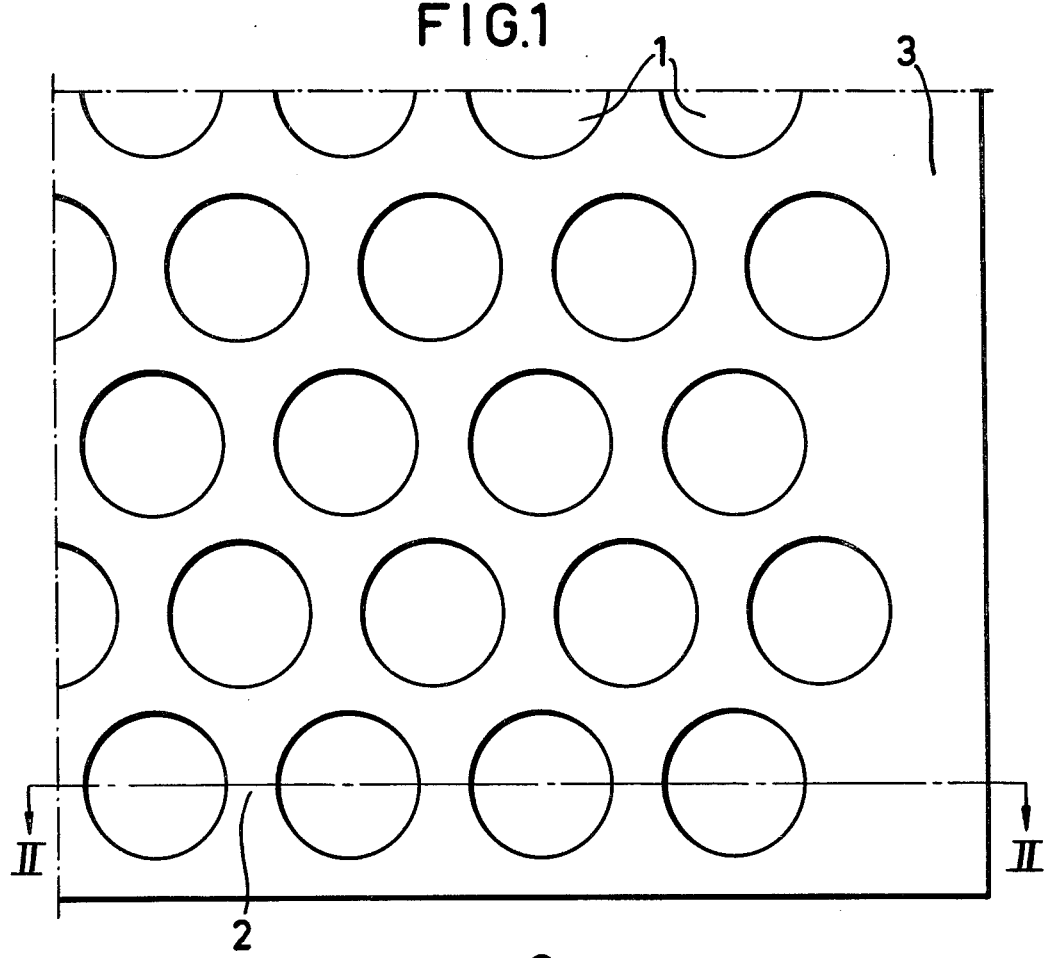

United States Patent [19]

Karlsson

[11] 4,211,185

[45] Jul. 8, 1980

[54] FLOOR MAT FOR STALLS OR CRIBS

[76] Inventor: Rune Karlsson, Blacksta, POB 5133, Nyköping, Sweden, 611 00

[21] Appl. No.: 918,518

[22] Filed: Jun. 23, 1978

[30] Foreign Application Priority Data

Jun. 27, 1977 [SE] Sweden ............................. 7707394

[51] Int. Cl.² ............................................. A01K 29/00
[52] U.S. Cl. ...................................................... 119/28
[58] Field of Search .............................. 119/28, 27, 16

[56] References Cited

U.S. PATENT DOCUMENTS 2,733,684  2/1956  Trenchard ............................. 119/28
3,699,926  10/1972  Stocki ..................................... 119/28

FOREIGN PATENT DOCUMENTS 2320623  4/1973  Fed. Rep. of Germany ............ 119/28
104078   3/1963  Netherlands ............................... 119/28
6709312  1/1969  Netherlands ............................... 119/28

Primary Examiner—Jay N. Eskovitz

[57] ABSTRACT

The invention relates to a non-skid foor mat for stalls or cribs, which is provided on its underside with depressions separated from each other so that a coherent mat bottom is formed between the depressions. The side walls of the depressions are preferably parallel.

6 Claims, 2 Drawing Figures

FLOOR MAT FOR STALLS OR CRIBS

This invention relates to a floor mat for stalls or cribs to be used as tread floor laying for animals placed in stalls and compartments.

There is a very great problem in preventing animals, primarily neat cattle, from slipping on the floor. So far wooden grate floors or concrete floors have been used. However, both these types of floors will be very slippery after being saturated with the droppings of the animals. Therefore attempts have been made, using some sort of mat, to prevent the animals from sliding, which may have catastrophic consequences.

So a rubber mat with grooves has been used, either in a stripe or drop pattern on the underside of the mat, in order to obtain a resilient hold of the animal hoofs on the mat. Due to the construction of the mat the hoof will, however, depress a depression in the mat, which depression does not follow the form of the hoof but will be substantially bigger than the hoof itself. In principle this has the consequence that no hold is obtained for the hoof which then is not prevented from sliding on the mat. Due to its construction the mat will also be trodden down and rolled up or get an appearance similar to a trough.

Attempts have also been made to manufacture mats or hard rubber in two layers with an intermediate layer of foam rubber. Nor does this mat bring any positive effect with respect to preventing animals from slipping, because also at this mat the depression of the hoof in the mat will be diffuse and substantially bigger than the very hoof. It seems uneconomical, as is now the case at manufacture, only to rely on ever softer rubber qualities. In the long run the quality should merely be decided by the best strength and resistibility.

This invention solves said problems in such a way that the mat is provided with depressions on its underside with substantially parallel walls, the bottom material of the mat between the depressions forming a coherent or undivided mat bottom, the hoofs of animals standing on the mat being distinctly depressed in the mat and the latter's area dimension or edge measure being unchanged.

Figure 2:
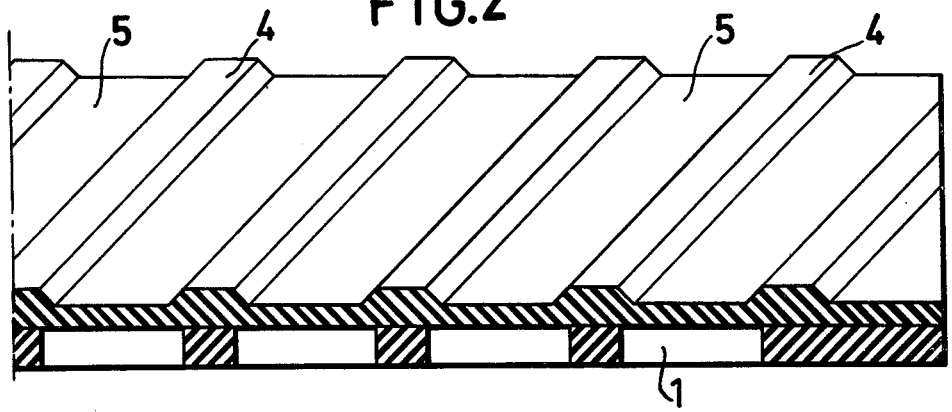

The invention will now be described in the form of an example with reference to the drawing, wherein FIG. 1 shows the mat as seen from below and FIG. 2 the mat as seen in section II—II and partly in perspective.

The mat consisting of a rubber type material is on its underside provided with circular holes or recesses 1, which are arranged in a zigzag pattern. These recesses made in the bottom of the mat allow a complete continuous land of bottom material or binding 2 in all directions in the bottom surface 3 of the mat that maintains the undivided state of the bottom surface 3.

The size of the recesses 1 can vary all according to which animals the mat is intended for. Light animals, such as milk cows, require a mat with recesses of about φ 30 mm, medium heavy animals a mat of about φ 25 mm and extremely heavy animals a mat of about φ 20 mm. Alternatively the depth of the holes or recesses can be changed. The minimum distance between two adjacent holes must not be less than about 6 mm, whereas at the same time it must not exceed about 12 mm. If this value is exceeded the effect intended by the invention is not achieved.

Said binding 2 of the bottom surface 3 of the mat together with the possible variation of the size of the recesses 1 provides a mat, which independently of the size of the depression maintains its form and size and forms a completely non-skid support. Thanks to the binding 2 the mat will be exactly as wide or long as the unloaded mat even if one or more animals are standing on the mat. This is a difference to known rubber stall mats, which contract when being trodden. Through the recesses 1 and depending on its diameter, it will be achieved that the mat is constantly adapted to the size of the depression.

Thus, thanks to the holes and their adapted size a depression exactly formed according to the hoofs of the animals—which is very important—is obtained, which effectively prevents the hoofs from slipping on the mat independently of whether this is covered with droppings or not.

On its upper side the mat shown is provided with ridges 4 and grooves 5, which are intended to drain liquid as well as to promote ventilation when the animal is lying on the mat.

As is apparent the binding 2 acting in all directions of the mat as well as the size of the recesses is an essential part of the invention, and therefore the form of the holes 1 is not crucial. So the holes can also have five or more corners or be square.

It is possible with the mat of the invention to utilize effectively the material of the mat to resist wear and other external mechanical damage, as the mat can be made thick without its non-skid properties being risked. Moreover, through the invention the contact surface of the mat against the support will be constant in load, which is of a very great importance.

It is of course possible within the scope of the invention to arrange the holes or recesses 1 in straight lines instead of in zigzag form.

What I claim is:

1. A floor mat having top and bottom surfaces, a given area dimension and being made throughout of a compressible material for use in animal stalls, the improvement comprising a plurality of recesses in a predetermined pattern having parallel walls and being located in the bottom surface of the mat and an undivided bottom surface formed of a continuous land of the bottom material having a continuous, lower surface in a plane coincident with the bottom-most level of the mat and extending in all directions surrounding said recesses, said recess parallel walls being substantially vertical and in planes normal to said continuous land, said recesses having a diameter of at least 20 mm, said continuous land between adjacent recesses having a minimum distance of between about 6 to 12 mm, said recesses having a continuous lower edge in a plane coincident with the bottom-most level of the mat, whereby hoofs of animals standing on the mat are distinctly depressed in the mat with the area dimension of the mat being unchanged thereby.

2. A floor mat as claimed in claim 1, wherein the recesses have a diameter of about between 20 and 30 mm.

3. A floor mat as claimed in claim 1, wherein the recesses are squareformed.

4. A floor mat as claimed in claim 1, wherein the recesses have more than four corners.

5. A floor mat as claimed in claim 1, wherein the recesses are arranged in zigzag shaped lines lying close to each other and forming a symmetrical pattern.

6. A floor mat as claimed in claim 1, wherein the top surface of the mat includes ridges and grooves.

* * * * *